June 4, 1968   W. B. PESTER ET AL   3,386,195
SLIDE TRAY FOR PROJECTOR

Filed Nov. 28, 1966   4 Sheets-Sheet 1

INVENTORS
William Bruce Pester
Albert J. Schwarz
Charles F. Seitz

Att'ys

June 4, 1968 W. B. PESTER ET AL 3,386,195
SLIDE TRAY FOR PROJECTOR
Filed Nov. 28, 1966 4 Sheets-Sheet 2

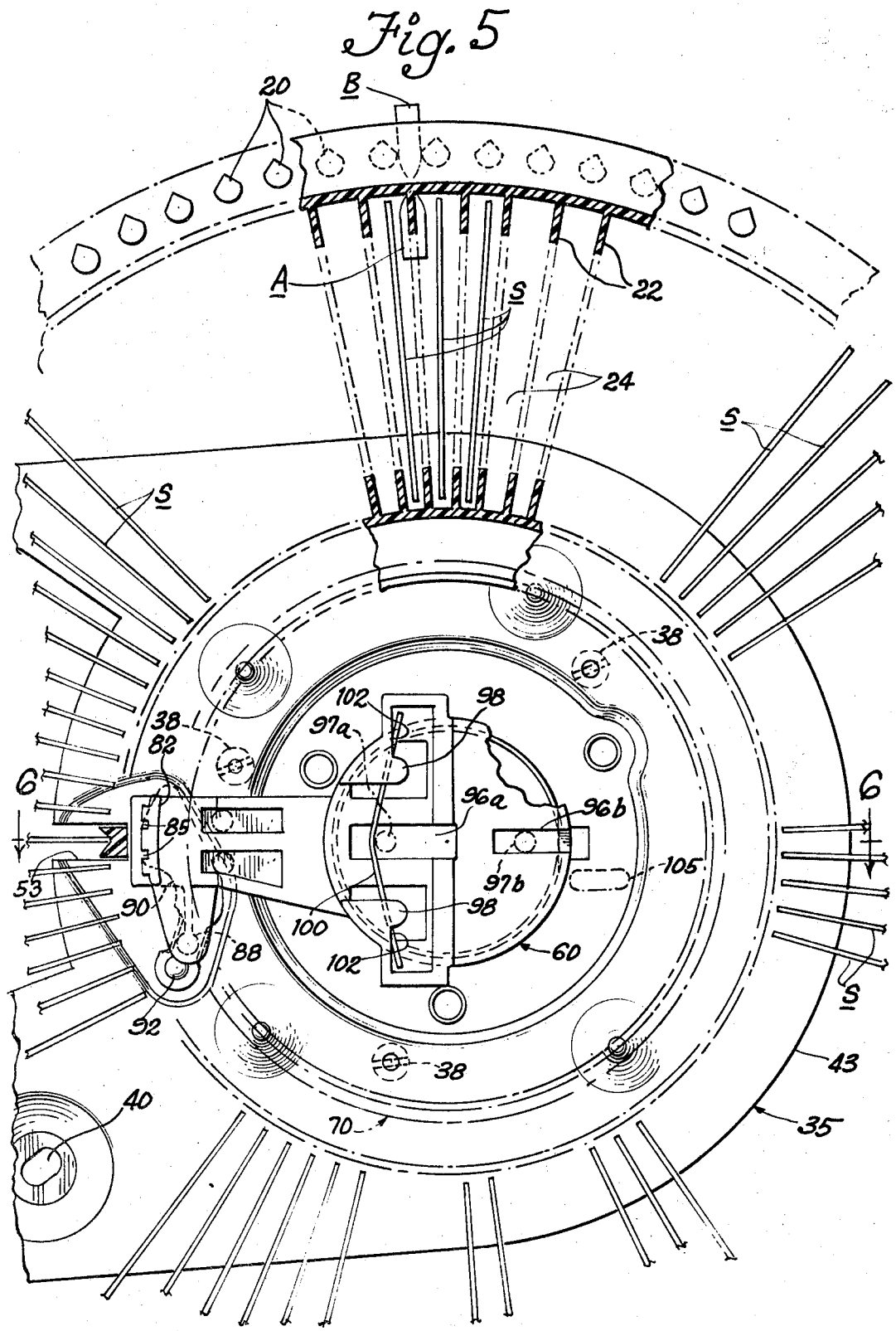

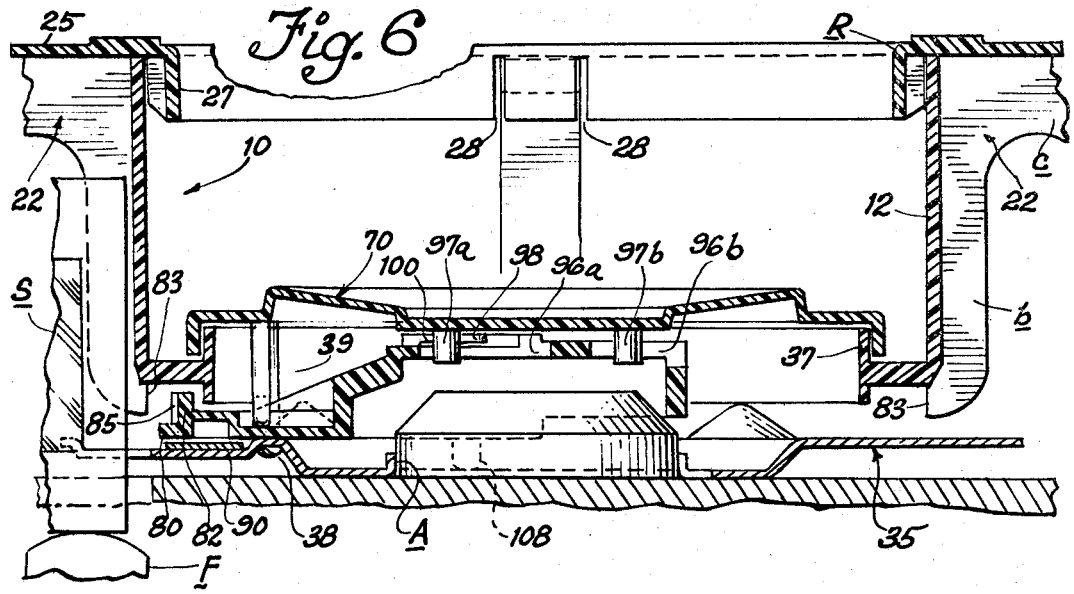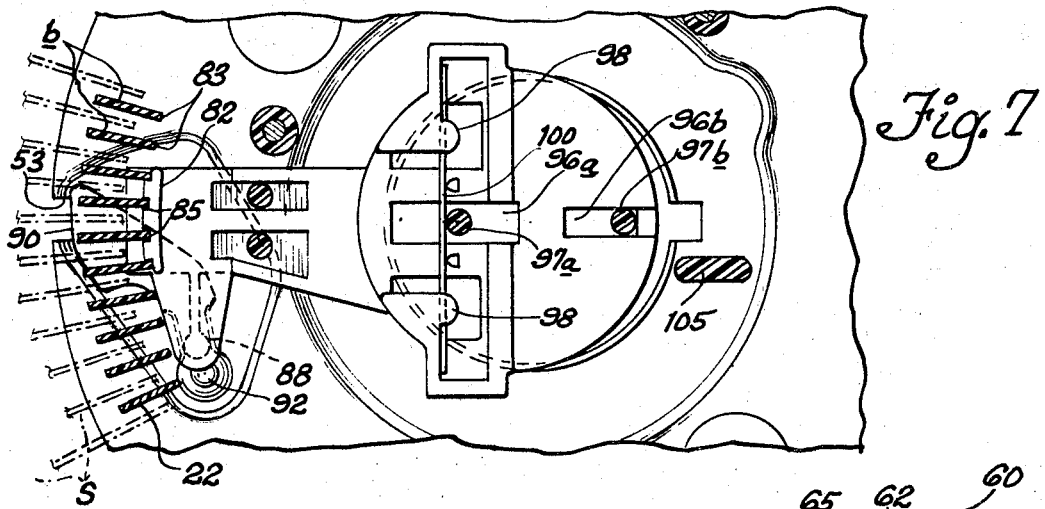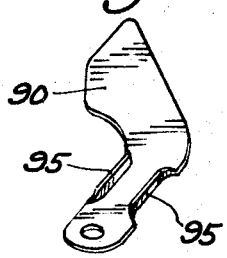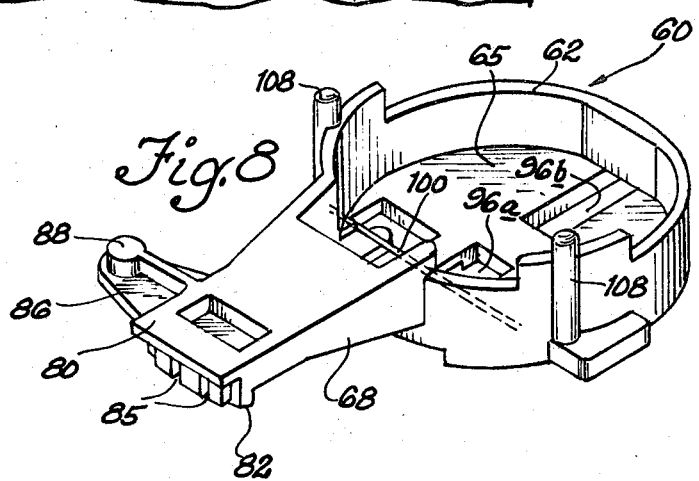

3,386,195
SLIDE TRAY FOR PROJECTOR

William Bruce Pester, Ann Arbor, Mich., and Albert J. Schwarz, Lincolnwood, and Charles F. Seitz, Oak Park, Ill., assignors to Sears, Roebuck and Co., Chicago, Ill., a corporation of New York
Filed Nov. 28, 1966, Ser. No. 597,367
8 Claims. (Cl. 40—79)

ABSTRACT OF THE DISCLOSURE

A circular magazine for a slide projector, suitable for use apart from a projector for storage of a large number of transparencies, mountable on or detachable from the projector in any angular position, and including a detachable translucent ring serving a dual function, i.e., of retaining the slides in the magazine and also, by means of numerals on the ring, of indexing the slides stored in the magazine. The magazine has a skeletonized base plate, permitting forced ventilation of the slides and also illumination of the indexing ring from the projector light source. The base plate is slotted to permit passage of a slide from the magazine to projection position, and this slot is closed by a spring-biased gate when the magazine is removed from the projector. Said gate is automatically retracted when the magazine is mounted on the projector.

---

Our invention relates generally to the art of projecting photographic transparencies, commonly known as slides, and has to do more particularly with a new and improved tray or magazine employed in conjunction with a projector for sequentially projecting slides onto a screen and, when not so employed, useful for storage of a substantial number of such slides, say, up to 80 or more.

Our invention constitutes an improvement in a highly developed and relatively old art. Projectors and magazines for employment therewith have taken a wide variety of forms. For many years it has been considered highly expedient for such magazines to take a circular or drum-like form. In some instances such magazines have been mounted on a projector on a horizontal axis, rotating in a vertical plane, as exemplified in the patent to Braun 1,082,260; Lehman 1,605,245 and Pollan et al. 2,748,653.

In other instances the magazine has been mounted on a vertical axis, rotating in a horizontal plane, as exemplified by the patents to Petherick 1,354,682; Bernabei 2,938,287, Bodie 2,221,753 and Robinson 3,276,156.

Within these general types may be found a wide variety of arrangements for feeding a slide from its cell in the magazine to proper projection position and thereafter returning the slide to its cell, in some instances the slide being moved radially while in others it has been moved in a transverse direction, certain advantages being inherent in all of said arrangements.

Our invention is directed to a construction which finds its best application to a circular drum-like magazine comprising a reservoir member having inner and outer circular walls defining an annular space with equispaced radial partitions defining slide chambers or cells. Said magazine is so designed and constructed that it may be quickly attached to or detached from a projector for which it is adapted and, when not used in the projection of slides, forms a convenient slide storage receptacle.

Said magazine is designed for rotation on a projector by suitable mechanism in the latter, to bring any desired slide into projection position.

Our improved tray or magazine is of the type from which a slide is fed to projection position in the projector by movement in its own plane, permitting the slide to fall from its compartment in the magazine to the projection position therebelow in the projector, and thereafter being elevated by follower means in the projector to restore the slide to its compartment in the tray.

Trays and projectors of this general type have been previously known, as disclosed for example in Robinson 3,276,156, but have had certain inherent disadvantages. Thus, in trays of this type previously known, it has been possible to mount the tray on the projector only in a certain fixed or "zero" position, after which the tray might be rotated on its axis either in a step-by-step sequence or, if desired, through any arc to reach a particular slide whose projection was desired.

A particular object of our invention is to provide a circular tray capable of being mounted on a projector in any desired radial position, adding greatly to the convenience of operation. Conversely, a magazine embodying our invention may be removed from the projector at any point in its rotation, without the necessity of first finding its zero position on the projector.

Another particular object of our invention is to provide an illuminated element keyed to the tray and bearing clearly visible numerals indexing the respective slides, whereby the tray may be rotated in a dark room to bring into projection position any desired slide.

This may be accomplished by provision of a translucent indexing ring which may be snapped into a keyed position on the tray above the slide compartments, this ring carrying indicia identifying each slide compartment, and providing means for illuminating said ring and indicia from the light source in the projector.

In accordance with our invention, we provide a drum-like circular reservoir wherein the slides are retained at the top by means of the translucent ring above described and at the bottom by means of a detachable plate of relatively small diameter and rotatable relative to the reservoir, underlying only the inner portions of the bottom edges of the slides. This limited support is sufficient to prevent the slides from dropping out of their respective cells or compartments.

Said plate is provided with a slot slightly wider than the thickness of a slide, to permit passage of a slide therethrough into and out of projection position. Gate means is carried by said plate normally closing said slot when the magazine is detached from a projector, so that, regardless of the relative radial positions of the drum and plate, all slides in the magazine will be retained securely within the magazine when the latter is detached. Said gate is spring-biased and so designed and constructed that it will normally be retracted automatically on positioning the magazine on a projector, thus freeing the slide which happens to be in projection position, permitting it to drop through the slot. Conversely, when the tray is removed from a projector, said spring-biased gate will automatically be restored to its normal slide-retaining position.

A further object of our invention is to provide a device of the character described which may be inexpensively constructed, certain and foolproof in operation and generally satisfactory for the purposes desired.

Other objects and advantages will become apparent to those skilled in the art as the description proceeds.

Referring now to the drawings forming a part of this specification and illustrating a preferred embodiment of our invention, FIG. 1 is a top plan view of a slide tray or magazine embodying our invention, with parts broken away for added clearness;

FIG. 5 is a fragmentary sectional view on an enlarged scale taken substantially along line 5—5 of FIG. 4, the parts being shown in the position occupied when the magazine is disposed on a projector;

FIG. 6 is a fragmentary sectional view taken substantially along the line 6—6 of FIG. 5;

FIG. 7 is a fragmentary plan view of certain movable parts as seen in FIG. 5, but in the position occupied when the magazine is removed from a projector;

FIG. 8 is a perspective view on an enlarged scale of a gate-control element forming part of our invention, and FIG. 9 is a perspective view of a slide-blocking gate member forming an element of the preferred structure.

Figure 1:
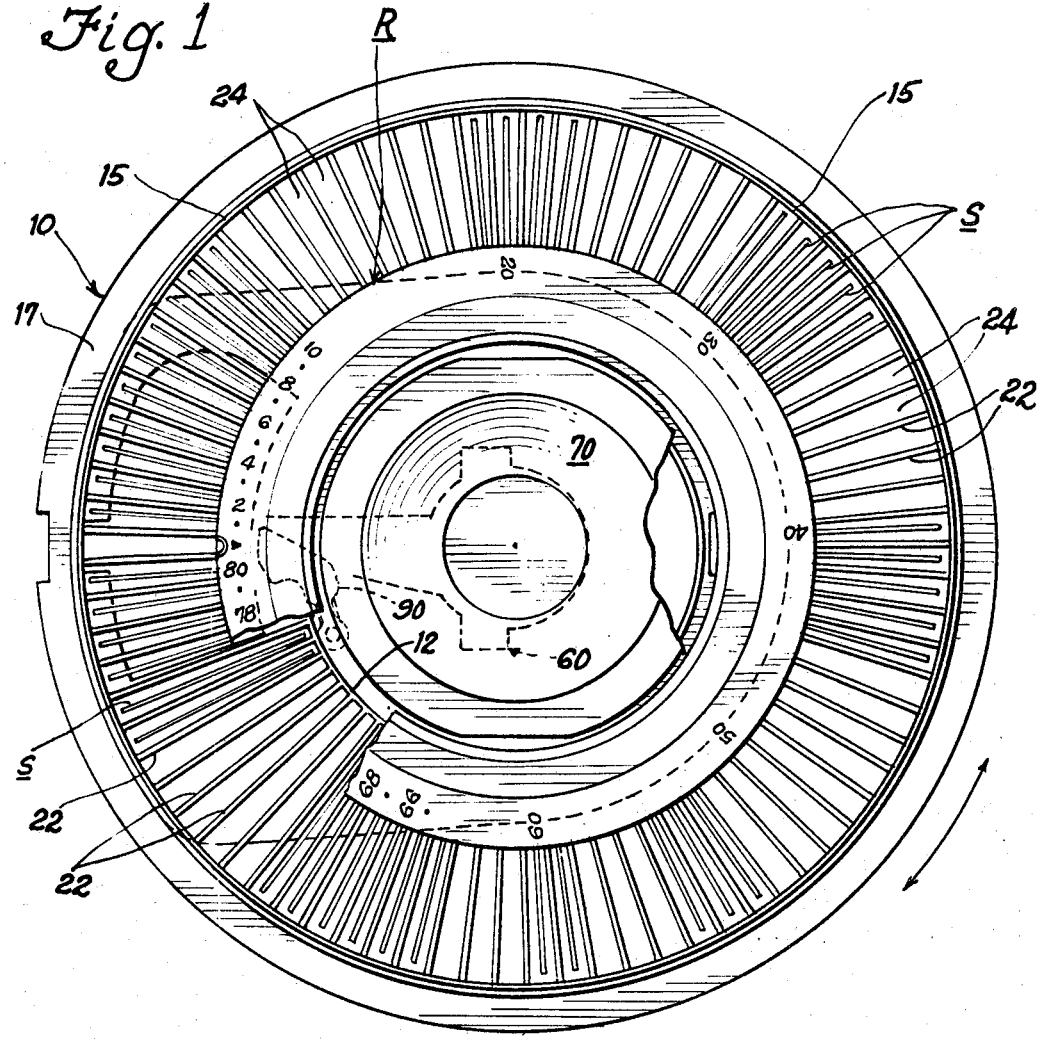
Figure 2:
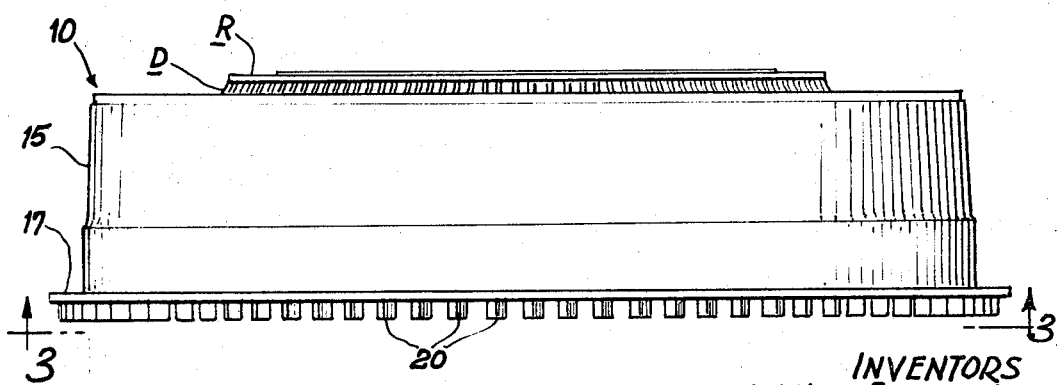
FIG. 2 is a side elevational view thereof.

Our improved magazine or tray comprises an integral drum-like reservoir member 10, preferably molded of a suitable plastic such as hard rubber or a synthetic resin of suitable character to provide the necessary strength and rigidity such as one of the polymers, e.g., the styrenes, urethanes, ethylenes or other well known synthetic resins, although it could be die-cast of a light weight metal such as aluminum or magnesium if desired.

Said reservoir 10 is essentially in the form of an annulus defined by an inner wall 12 and an outer wall 15, the latter having an outwardly extending peripheral flange 17 at the base thereof. If desired, numerals (not shown) might be molded on the upper surface of flange 17 indexing the slides held by the tray.

A plurality of integrally molded equispaced studs 20 project downwardly from the bottom of said flange 17, serving as cogs or ratchet teeth for engagement by an advancing member A, (FIG. 5) carried by the projector (not shown). It will be understood that, subject to operator control, member A will be moved out to a position between a pair of cogs 20 and then rotate the tray in either direction the space of a single slide, in a step-by-step progression of the magazine when disposed on a projector. A positioning or locking finger B on the projector is moved into and out of position between the cogs on each tray-advancing movement, whereby the tray is held in fixed position when not being rotated.

Figure 4:
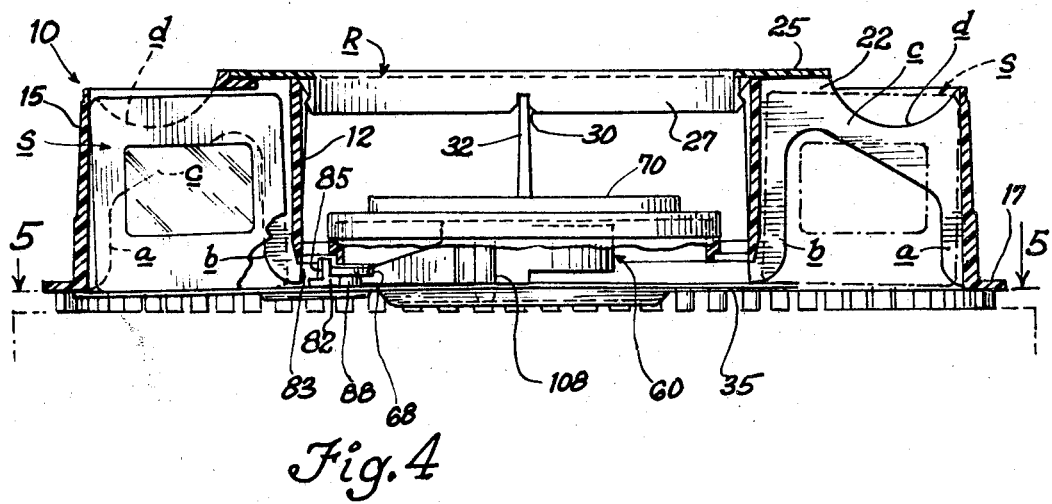
FIG. 4 is a sectional view taken substantially along the line 4—4 of FIG. 3.

A plurality of equispaced divider or separator plates 22 are molded integrally with the reservoir, connecting inner wall 12 with outer wall 15, said separators 22 providing cells or spaces 24 therebetween for reception of slides S. It will be seen that the separator plates 22 (FIGS. 4 and 6) are skeletonized, consisting essentially of front and back legs a, b, with a connecting web c therebetween, the latter having an arcuate edge d at the top thereof (FIG. 4) permitting slides S to project up out of their cells to facilitate grasping by the fingers for convenient unloading of the tray.

A circular detachable ring R is provided at the top portion of the reservoir over inner wall 12 for the dual purpose of retaining the slides from inadvertently falling out of the reservoir when the latter is detached from a projector, and also for indexing the slides disposed therein. This ring R is preferably molded of a suitable translucent plastic resin or other suitable material, preferably of light color, and bears numerals corresponding to the cells or compartments formed in the reservoir, such numerals preferably being opaque and of black or other contrasting color.

Thus, light passing upwardly through the compartments, or some of them, from the source of illumination in the projector will pass through the ring in a diffused glow while the dark numerals will be silhouetted against such glow, rendering the numerals clearly visible to the operator in a darkened room and greatly facilitating the operation of the projector.

Said ring R is angular in cross section (FIG. 6), having a generally horiozntal flange 25 and an integral depending flange 27. Said flange 27 may be provided with a plurality of notches 28 spaced around the periphery thereof in order to impart a degree of resilience to said flange 27, and the latter may also be provided with a notch 30 for keying said ring R in cooperation with a rib 32 molded on the inner wall 12 of reservoir 10, whereby said ring R is attachable to the reservoir in a fixed position circumferentially (FIG. 4), and thus the ring will serve to index the slides housed in the reservoir. Other suitable means may serve for attaching the ring R, such as a cam, bayonet lock, etc.

A bottom plate 35 formed of sheet metal, sheet plastic or other suitable stiff material is attached to reservoir 10 as by means of a cooperating disc 70, preferably of molded plastic (FIGS. 5 and 6), said plate and disc being disposed on opposite sides of and engaging a T-shaped flange 37 formed on the bottom of inner wall 12 of the reservoir and being secured by screws 38 received in female-threaded posts 39 formed on disc 70. Plate 35 is provided with a suitable deformation, such as an aperture 40, designed to register with a corresponding element such as an upstanding stud attached to a projector, whereby the plate may be keyed to the projector in a definite position circumferentially thereof.

It will be noted that plate 35 is thus non-rotatably although detachably fixed to the projector while the reservoir is free to be rotated by the operator relative to said plate and projector.

Figure 3:
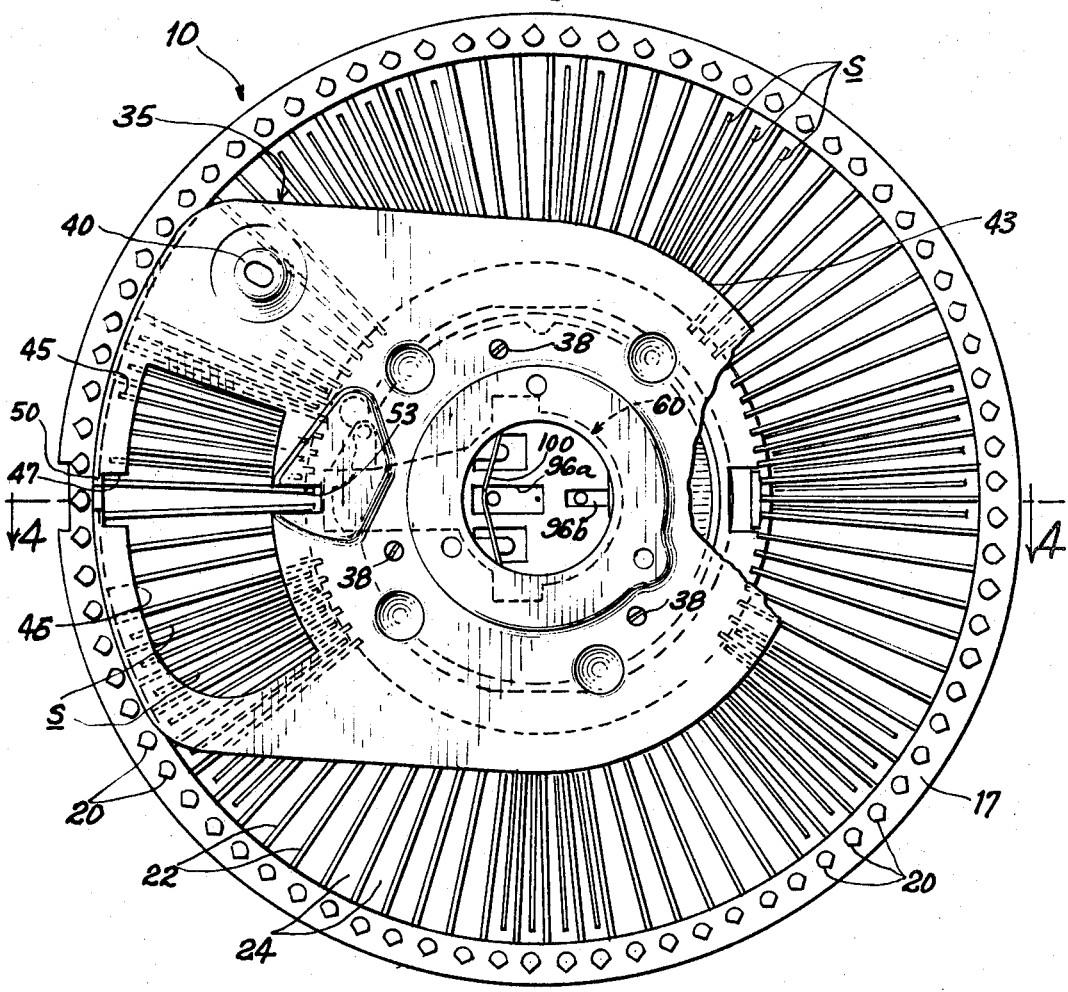
FIG. 3 is a bottom plan view of the same, also with parts broken away.

Referring to FIG. 3, it will be seen that plate 35 comprises a generally semi-circular portion 43 underlying a portion of the bottom inner edges of slides S disposed in the magazine, this portion being sufficient to prevent the slides from inadvertently dropping out of the reservoir. However, as clearly seen in FIG. 3, the diameter of that portion of plate 35 which underlies approximately one-half of the total number of slides stored within the reservoir need not be great.

Such construction not only effects a major saving of metal but also other advantageous results. For example, efficient ventilation of the slides from the blower in the projector is obtained, preventing buckling or warping of the slides from the heat. Also, light is permitted to pass up to indexing ring R.

Opposite semicircular portion 43 of plate 35 the latter extends outwardly toward the periphery of the reservoir to form a relatively narrow web portion 45 designed to underlie the outer bottom edges of the slides, this web 45 being of a width approximating that of the semi-circular portion 43 of plate 35 which underlies the inner bottom edges of the slides. It will be noted that a major portion of the plate 35 is cut out adjacent web 45, as indicated at 46, again improving slide ventilation as well as illumination of ring R.

A portion of web 45 is cut out as at 47, the width of said cut-out being somewhat greater than the thickness of a slide and the opposite walls of said cut-out being connected by a relatively narrow circumferential bridge 50 integral with plate 35. Said plate is also notched radially opposite cut-out 47, as indicated at 53, the latter also being slightly greater than the thickness of a slide, the distance between the extremities of the cut out portions 47 and 53 being slightly greater than the overall width of a slide to permit passage of a slide from the reservoir downwardly into a projector for display and subsequent return of the slide from the projector back into the reservoir (see FIG. 3) by means of a slide-feeding finger F in the projector (FIG. 6).

Means attached to plate 35 is provided for locking the reservoir against rotation relative to the plate and projector and also for preventing inadvertent escape of a slide from the tray when the latter is removed from a projector, and this arrangement will now be described.

Disposed between plate 35 and disc 70 is a radially reciprocable member 60, seen best in perspective in FIG. 8, this member preferably being molded of a suitable synthetic resin and having a generally circular flange 62 extending normally from a relatively flat circular portion 65, the latter being disposed in a plane parallel to that of plate 35. Thus, plate 35, reciprocable member 60 and disc 70 constitute a unit, rotatable as such relative to reservoir 10.

Projecting from circular portion 62, 65 of reciprocable member 60 is an arm 68 at the forward end of which is a transverse portion 80. Extending normally from said transverse portion is a foot portion 82 having a plurality of serrations 85 in the outer face thereof, these serrations being of a width to receive the edges 83 (FIG. 6) of the cell divider plates 22 for locking the reservoir against rotation when the magazine is removed from a projector.

Projecting laterally from transverse portion 80 is an integral arm 86 from which projects normally a stud-like actuating member 88 for controlling a gate 90 pivotally attached to plate 35 as at 92 (FIGS. 5, 7 and 9), said gate serving to close aperture 53 when the magazine is removed from a projector, thus preventing inadvertent escape of a slide therethrough.

As best seen in FIG. 9, gate member 90 may be in the form of a bell-crank, one arm of which has a pair of normally struck-up opposed flanges 95 between which rides stud 88 (FIG. 7).

Member 60 is provided with diametrically alined slots 96a and 96b (FIGS. 5, 7 and 8) which receive studs 97a and 97b molded integrally with disc 70, said studs and slots cooperating to guide member 60 in its reciprocating movement.

As seen best in FIG. 5, member 60 has formed therein a pair of coplanar tongues 98, 98 displaced from the inner face of circular portion 65, which tongues serve to support a tempered wire spring 100 the extremities of which abut against spaced shoulders 102 formed on molded member 60 (FIG. 5). A post 105 molded integrally with disc 70 and extending normally from the inner face thereof serves as a stop to limit inward movement of member 60.

Studs 108 projecting from member 60 serve as bearing members, engaging plate 35 (FIG. 6).

In use, when the tray is separate from a projector, member 60 will be urged outwardly by spring 100, in which position it will serve to urge gate 90 out to close aperture 53, thus preventing the escape of any slide which may be in position to drop therethrough. Also, in this condition, serrations 85 will positively engage the edges 83 of the separator plates defining the cells in the reservoir. Thus, the reservoir will be locked against rotation relative to plate 35.

When the tray is put on a projector, a boss or the like formed on the latter will enter circular aperture A in plate 35 and will at the same time enter ring 62 of molded member 60 to cam inwardly molded member 60 against the resilient outward urge of spring 100, thus effecting rotation of gate 90, opening slot 53 to permit passage of a slide therethrough. By the same movement of member 60 disengagement will be effected between the cell separator plates 22 and serrations 85 on foot portion 82.

One or more apertures are provided in plate 35 to cooperate with upstanding studs (not shown) in a projector to prevent engagement of the reciprocating member and actuation thereof by a part on a projector until the tray is properly adjusted circumferentially.

Bosses (FIGS. 3, 5 and 6) are pressed out of plate 35 for spacing the latter from the reservoir.

Various changes coming within the spirit of our invention may suggest themselves to those skilled in the art. Hence, we do not wish to be limited to the specific form shown or uses mentioned, but intend that the scope of our invention be determined solely by the appended claims.

We claim:
1. A circular slide tray for use alternatively on a projector and for slide storage apart therefrom, comprising
   (a) an integral molded annular reservoir member having inner and outer walls and spaced radial separator plates connecting said walls and defining therebetween cells for housing slides,
   (b) a slide-retaining ring detachably mounted above said inner wall and overlapping a minor radial portion of said cells,
   (c) a slide-supporting plate underlying said reservoir and rotatably connected thereto, said plate being detachably mountable on a projector and having a slot for passage of a slide to and from a projector,
   (d) a movable gate carried by said plate for restricting said slot, to prevent passage of a slide, and
   (e) means carried by said plate and rotatable therewith for automatically actuating said gate to close said slot when the tray is removed from a projector.

2. A slide tray as in claim 1, wherein said plate is of such restricted area as to expose a major portion of said cells at the bottom thereof, radially of the reservoir, to facilitate ventilation of the slides contained in said cells.

3. A slide tray as in claim 2, wherein said ring is translucent and bears cell-identifying indicia, and has means keying the ring to the reservoir in a single angular position, said indicia being visibly defined by light from the projector.

4. A circular slide tray for use alternatively on a projector and for slide storage apart therefrom, comprising
   (a) an integral molded annular reservoir member having inner and outer walls and spaced radial separator plates connecting said walls and defining therebetween cells for housing slides,
   (b) a slide-supporting plate underlying said reservoir and rotatably connected thereto, said plate being detachably mountable on a projector and having a slot for passage of a slide to and from a projector,
   (c) a movable gate carried by said plate for restricting said slot, to prevent passage of a slide, and
   (d) means carried by said plate and rotatable therewith for automatically actuating said gate to close said slot when the tray is removed from a projector.

5. A slde tray as in claim 4, wherein
   (a) said inner wall has a transverse supporting flange,
   (b) said plate being disposed outside said flange,
   (c) a retaining member attached to said plate and disposed on the opposite side of said flange,
   (d) said gate-actuating means is disposed between said plate and retaining member and rotatable with them on said flange,
   (e) means being provided on one of said plate and retaining member for restricting the movement of said gate-actuating means.

6. A combination as in claim 4, wherein
   (a) said gate-actuating means is a spring-biased reciprocating element having means thereon engageable with the reservoir for locking the latter against rotation on the plate,
   (b) said gate-actuating means also having an element operable by a member fixed on a projector when the tray is mounted on a projector for moving said actuating means to urge the gate into open position and to disengage said locking means.

7. A combination as in claim 5, wherein (a) said supporting flange includes an upstanding circular bearing member, and
(b) said retaining member is a generally disc-shaped element ridable on said bearing member.

8. A combination as in claim 5, wherein
(a) said gate-actuating means is a spring-biased reciprocating element having means thereon engageable with the reservoir for locking the latter against rotation on the plate,
(b) said gate-actuating means also having an element operable by a member fixed on a projector when the tray is mounted on a projector for moving said actuating means to urge the gate into open position and to disengage said locking means.

References Cited
UNITED STATES PATENTS 3,276,156    10/1966    Robinson _____ 40—79

EUGENE R. CAPOZIO, *Primary Examiner.*

W. GRIEB, *Examiner.*